United States Patent
Guo et al.

(10) Patent No.: US 11,347,488 B2
(45) Date of Patent: May 31, 2022

(54) COMPILING DOMAIN-SPECIFIC LANGUAGE CODE TO GENERATE EXECUTABLE CODE TARGETING AN APPROPRIATE TYPE OF PROCESSOR OF A NETWORK DEVICE

(71) Applicant: Fortinet, Inc., Sunnyvale, CA (US)

(72) Inventors: Zhi Guo, San Jose, CA (US); John Cortes, Santa Clara, CA (US); Hao Wang, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 13 days.

(21) Appl. No.: 16/877,204

(22) Filed: May 18, 2020

(65) Prior Publication Data

US 2021/0357194 A1    Nov. 18, 2021

(51) Int. Cl.
*G06F 9/45* (2006.01)
*G06F 8/41* (2018.01)
*G06F 8/30* (2018.01)

(52) U.S. Cl.
CPC .............. *G06F 8/447* (2013.01); *G06F 8/315* (2013.01)

(58) Field of Classification Search
CPC . G06F 8/447; G06F 8/315; G06F 8/37; G06F 8/40; G06F 8/41; G06F 8/443; G06F 8/437
USPC ......................................................... 717/140
See application file for complete search history.

(56) References Cited

U.S. PATENT DOCUMENTS

| | | | | |
|---|---|---|---|---|
| 4,954,945 A | * | 9/1990 | Inoue .................... | G06F 9/5066 718/105 |
| 6,970,468 B2 | * | 11/2005 | Doidge ............... | H04L 12/5601 370/395.1 |
| 8,213,305 B2 | * | 7/2012 | Raghunath ............ | G06F 9/5044 370/464 |
| 8,738,860 B1 | * | 5/2014 | Griffin ................ | G06F 12/0897 711/122 |
| 10,802,855 B2 | * | 10/2020 | Romero Zaldivar ........................ | G06F 9/4552 |
| 2004/0025150 A1 | * | 2/2004 | Heishi ..................... | G06F 8/443 717/154 |

(Continued)

OTHER PUBLICATIONS

Congestion control in computer networks: trends and issues; author: R Jain , published on 1990.*

(Continued)

*Primary Examiner* — Chameli Das
(74) *Attorney, Agent, or Firm* — HDC Intellectual Property Law, LLP

(57) ABSTRACT

Systems and methods for programming a network device using a domain-specific language (DSL) are provided. According to one embodiment, source code in a form of a DSL, describing a slow-path task that is to be performed by a network device, is received by a processing resource. A determination is made regarding one or more types of processors are available within the network device to implement the slow-path task. For each portion of the source code, a preferred type of processor is determined by which the portion of the source code would be most efficiently implemented. When the preferred type of processor is available within the network device, executable code is generated targeting the preferred type of processor based on the portion of the source code; otherwise, intermediate code is generated in a form of a high-level programming language, targeting a general purpose processor of the network device.

22 Claims, 11 Drawing Sheets

(56) References Cited

U.S. PATENT DOCUMENTS

| | | | |
|---|---|---|---|
| 2004/0111715 A1* | 6/2004 | Stone | G06F 9/45504 717/148 |
| 2005/0193108 A1* | 9/2005 | Hirose | G06F 9/5072 709/223 |
| 2007/0195797 A1* | 8/2007 | Patel | H04J 3/0685 370/400 |
| 2012/0096445 A1* | 4/2012 | Berg | G06F 9/44547 717/140 |
| 2014/0012981 A1* | 1/2014 | Samuell | H04L 47/40 709/224 |
| 2016/0357530 A1* | 12/2016 | Cheng | G06F 8/47 |
| 2018/0173557 A1* | 6/2018 | Nakil | H04L 41/0631 |
| 2018/0217823 A1* | 8/2018 | Marshall | G06F 8/4441 |
| 2018/0343177 A1* | 11/2018 | Fazlyab | H04L 45/02 |
| 2019/0258533 A1* | 8/2019 | Lewis | G06F 9/544 |
| 2019/0384580 A1* | 12/2019 | Martini | H04W 76/12 |
| 2020/0028785 A1* | 1/2020 | Ang | H04L 61/256 |
| 2020/0267088 A1* | 8/2020 | Navratil | H04L 47/32 |
| 2020/0410354 A1* | 12/2020 | Zejda | G06F 9/3861 |

OTHER PUBLICATIONS

Title: A survey of multicore processors; author: G Blake, published on 2009.*

Title: Sora: high-performance software radio using general-purpose multi-core processors, author: K Tan et al, published on 2011.*

Title: Accelerating Virtual Network Functions with Fast-Slow Path Architecture using eXpress Data Path, author: N Van Tu, published on 2020.*

Title: Quick-Start and XCP on a network processor: Implementation issues and performance evaluation, author: S Hauger et al., pubslihed on 2008.*

Butler, Brandon, Network World, "What P4 programming is and why it's such a big deal for Software Defined Networking", published Jan. 31, 2017, 6 pages.

* cited by examiner

COMPILING DOMAIN-SPECIFIC LANGUAGE CODE TO GENERATE EXECUTABLE CODE TARGETING AN APPROPRIATE TYPE OF PROCESSOR OF A NETWORK DEVICE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to network processing and programming of network processors of network devices. In particular, embodiments of the present invention relate to a domain-specific language to describe network functions, for example, slow-path tasks in network processing that are performed by network security devices.

Description of the Related Art

Network devices may use one or both of general purpose processors and network processors, for example, in the form of Application-Specific Integrated Circuits (ASICs). Networking functions performed by network devices (e.g., firewalls, Unified Threat Management (UTM) appliance, routers, switches, and the like) can be implemented by software running on general purpose processors or by network processors, which are optimized for packet processing tasks performed in network devices.

SUMMARY

Systems and methods are described for programming a network device using a domain-specific language. According to one embodiment, source code in a form of a domain-specific language is received by a processing resource. The domain-specific language describes a slow-path task that is to be performed by a network device. A determination is made regarding one or more types of multiple types of processors that are available within the network device to implement the slow-path task. For each portion of multiple portions of the source code a preferred type of processor of the multiple types of processors is determined by which the portion of the source code would be most efficiently implemented. When the preferred type of processor is among the one or more types of processors that are available within the network device, executable code is generated targeting the preferred type of processor based on the portion of the source code. When the preferred type of processor is not among the one or more types of processors that are available within the network device, intermediate code is generated in a form of a high-level programming language, targeting a general purpose processor available within the network device based on the portion of the source code.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
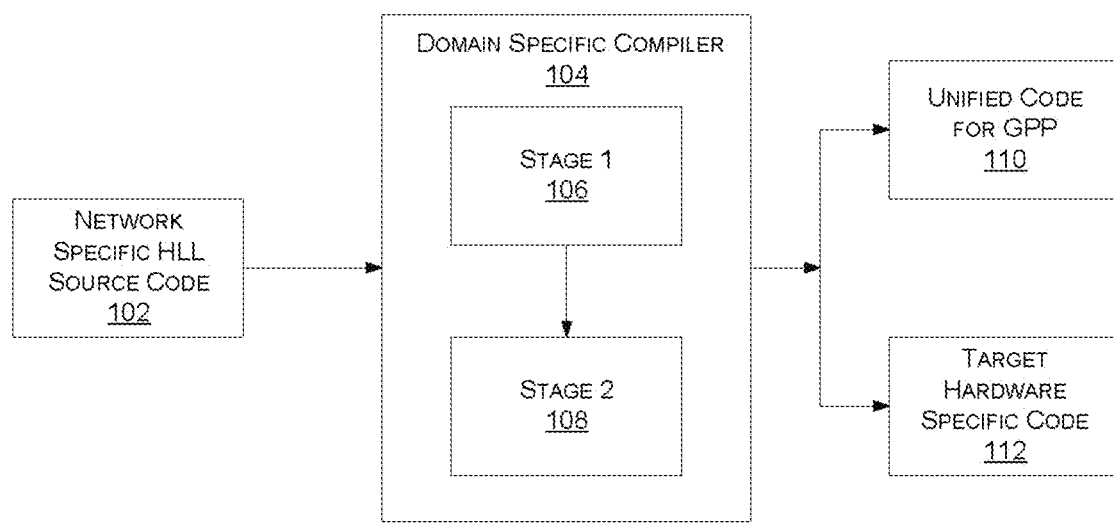
FIG. 1 illustrates an exemplary domain-specific language compiler in accordance with an embodiment of the present disclosure.

Systems and methods are described for programming a network device using a domain-specific language. In the following description, numerous specific details are set forth in order to provide a thorough understanding of embodiments of the present invention. It will be apparent to one skilled in the art that embodiments of the present invention may be practiced without some of these specific details.

Network appliance owners that deploy network appliances within enterprise networks and/or data centers desire more control over network devices and may wish to program their network devices (or have them programmed on their behalf) for a specific purpose. In order to support such customization, it may be desirable to have flexibility and programmability not only for network management software but also the hardware available within the network devices. For example, the owner of a network appliance may wish to customize a slow-path task or implement a new slow-path task, for example, on one or more general purpose processor(s) and/or network processor(s) of the network appliance. There exist some high-level programming languages, for example, P4, which enable fast path processing or data plane tasks to be described for controlling packet forwarding in networking devices, such as routers and switches. However, due to the complexity, the specialized skills needed and the lack of suitable tools, programming of more complex slow-path processing or control plane tasks is currently inaccessible to those other than the vendor and is typically performed by network engineers by writing assembly code.

Embodiments of the present invention seek to provide a domain-specific language that is suitable for describing slow-path network processing functions that is both device-independent and extendable. In one embodiment, the domain-specific language is considered device-independent because the user writing the domain-specific language code need not be aware of whether the targeted network device includes one or more network processors. Instead, as described further below, the compiler will partition the code into portions that are to be compiled into executable code targeted for one or more network processors, if available on the network device at issue, and portions that are to be compiled into executable code targeted for one or more general purpose processors available within the network device at issue.

According to one embodiment, the domain-specific language provides one or more of the following functionalities:
General variable definition;
General loop/flow control;
Network application specific bit operations;
Network application specific data structure descriptions;
Network application specific memory access descriptions;
Interfacing between network processor modules;
Hardware thread switching of an embedded network application specific processor and hardware thread switching of individual modules inside a network application specific processor; and
Mechanisms to extend to future functions.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

As used herein the "slow path" or "slow-path processing" generally refers to a processing path through a network device that involves unusual or complex processing. Packets received by a network device that can be processed with minimal or normal processing take the "fast path," whereas due to one or more unique operations that may be required, other packets may take the "slow path." In some network device implementations, fast path packets correspond to data plane tasks, while slow path packets corresponding to control plane tasks. For example, packets received by a firewall may be processed differently depending on one or more of their source Internet Protocol (IP) address, destination IP address, source port, destination port, protocol and the state of the matching session. In one embodiment, the first packet for a session will take the slow path as the session has not yet been created, whereas after the session has been created, subsequent packets associated with the session can take the fast path. In some network device implementations, slow-path processing is implemented by a central processing unit (CPU) and/or a network processing unit (NPU) and fast-path processing is implemented by a Field-Programmable Gate Array (FPGA), an ASIC, and/or a co-processor. Alternatively, fast-path processing may also be implemented by a CPU and/or an NPU.

Embodiments of the present disclosure describes methods and systems for generating machine readable instructions from domain-specific high-level language (HLL) code for different types of processing units used by a target network device.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

FIG. 1 illustrates an exemplary domain-specific language compiler 104 in accordance with an embodiment of the present disclosure. In an embodiment, domain-specific High-Level Language (HLL) source code, for example, network specific HLL source code 102, describing network tasks, can be received by the domain-specific compiler 104 for compiling the source code 102 to generate machine readable instructions for a target network device (e.g., a network security device).

In an embodiment, the domain-specific HLL may provide a number of functionalities to support description of various network tasks. Non-limiting examples of such functionalities include general variable definition, general loop or flow control, network application specific bit operations, network application specific data structure descriptions, network application specific memory access descriptions, interfacing between network processor modules, hardware thread switching of an embedded network application specific processor, and hardware thread switching of individual modules inside a network application specific processor. In an embodiment, the domain-specific HLL may include other functions and options to describe network tasks.

In an embodiment, the domain-specific compiler 104 can receive the network task description in the form of domain-specific HLL source code 102 as an input and generate intermediate code in the form of traditional high-level language code (e.g., C/C++ code) targeting one or more general purpose processors of the network device. In another embodiment, the domain-specific compiler 104 can receive the network task description in the form of domain-specific HLL source code 102 as input and generate binary code targeting one or more network processors of a network device. In yet another embodiment, the domain-specific compiler 104 can receive the network task description in the form of domain-specific HLL source code 102, partition the source code into separate portions—one for each type of processor (e.g., general purpose processor and network processor) implemented within the network device. For example, one portion of the domain-specific HLL source code 102 may be compiled to generate an intermediate representation in the form of traditional high-level language code (e.g., C/C++ code) targeting general purpose processors and another portion may be compiled to generate an intermediate representation (e.g., for purposes of performing desired optimizations), which can then be compiled to generate binary code targeting network processors.

In an embodiment, the domain-specific compiler 104 converts the network task descriptions written in the high-level language into machine executable code that is targeted for the network processor(s) and/or general-purpose processor(s) implemented by the network device at issue. In an embodiment, the domain-specific compiler 104 can generate unified code for a general-purpose processor (GPP) 110 that can be executed by the GPP and can also generate target hardware specific code 112 to be executed by a target network processor (NP). In an embodiment, the domain-specific compiler 104 can receive network task descriptions in the form of network specific HLL source code 102, which describes slow-path processing tasks to be performed by the target network device.

Responsive to receiving the source code 102 and depending upon the types of processing resources that are implemented by the target network device, the compiler 104 can analyze the source code 102 to determine a preferred type of processor by which various portions of the source code 102 would be most efficiently implemented. For example, certain tasks are known to be more efficiently performed by a network processor, if available within the network device at issue, than by a general purpose processor. Alternatively, the preference may be expressed by the source code 102. For example, various portions of the source code 102 may be expressed in the form of macros corresponding to those contained in macro libraries of the hardware modules. In this manner, a first set or portion of code, also referred to as a first part of the source code, written for a general purpose processor (e.g., expressed as a macro associated with a macro library of the general purpose processor) and a second set or portion of code, also referred to as a second part of the source code, written for a specific network processor (e.g., expressed as a macro associated with a macro library of the network processor) may be identified for compilation for the desired target by identifying macros contained in the source code 102 to matching macros associated with hardware.

In an embodiment, the compiler 104 can determine one or more processing units contained within the target network device and determine the types and versions of each of the one or more processing units. The types of processing units used by the network device may include a general-purpose processor or a network processor. Based on the determination of the processing units, parts of the source code 102 can be compiled to generate unified code 110 to be executed by one or more GPPs and parts of the source code 102 can be compiled to generate target hardware specific code 112 to be executed by one or more network processors. In a scenario in which the one or more processing units implemented within the network device are all general-purpose processors, a unified code can be generated. In scenario in which the processing units available within the network device include one or more network processors, then executable code targeting one or both of an available GPP and the available one or more network processors may be generated by the compiler 104.

In an embodiment, the compiler 104 processes the source code in two stages, referred to in the context of the present example as stage 1 106 and stage 2 108. During stage 1 106, the domain-specific compiler 104 may generate respective intermediate representations of the source code 102 after preprocessing the source code 102, and in stage 2 108, the intermediate representations can be converted into respective machine executable code for either or both of the GPP(s) or the NP(s). For example, stage 1 106 may generate a first intermediate representation for one or more parts of the source code that are to be performed by one or more GPPs in the form of another high-level language, such as C++ or java code etc., and may generate a second intermediate representation for other parts of the source code that are to be performed by one or more network processors in the form of a network task descriptor specific intermediate representation. In one embodiment, desired optimizations may be performed on the intermediate representation before initiating stage 2 108.

The domain-specific compiler 104 may include a stage 1 106 module that converts the a high-level language file into control flow graph (CFG) representations. In one embodiment the stage 1 106 module, may include instructions for initiating a traditional compilation by reading network task descriptors written in a form of the high-level language source code, parsing the source code, converting the source code into an intermediate representation and a symbol table. As described above, depending on the target machine on which the code needs to be executed, the intermediate representation in which the source code 102 is converted may differ. In an embodiment, the stage 1 106 module of the domain-specific compiler 104 may include logic instructions for performing syntactic and semantic checking of the source code, and for generating appropriate diagnostic messages in response to errors in the source code. The stage 1 106 module may also perform some optimizations in connection with generating the internal representation of the source code.

In an embodiment, the stage 2 108 module of the domain-specific compiler 104 can further process the intermediate representation for data flow analysis, generation of logic for target hardware device and generate executable code for target processor, depending on the type(s) of processor(s) used by the network device. The stage 2 module 108 may include domain-specific compilation instructions or use traditional compiler instructions associated with a traditional HLL compiler to convert the respective intermediate representation to control-data-flow representation. The control-data-flow graph may be used throughout the remainder of the compiler phases. The stage 2 108 module of the domain-specific compiler 104 may include logic instructions for converting the data flow graphs further into a hardware definition of the physical logic that will be instantiated in network processor or GPP. The stage 2 108 module of the domain-specific compiler 104 can read network processor specific macros to provide node input, output and latency information associated with the network processor. The stage 2 108 module can generate either a unified code for GPP 110 or can generate target network processor specific code. In an embodiment, the output file from the stage 2 compilation process may be in the form of a hardware definition language (e.g., Verilog or Electronic Design Interchange Format (EDIF)). In an embodiment, machine executable code can be generated for the target processing unit of the network device. Depending on the type of processing units used for slow-path processing, appropriate instructions can be used by the compiler 104 to generate the compatible machine executable code.

Embodiments of the present disclosure provide a domain-specific build system, which can receive slow-path network task descriptions in a domain-specific HLL and produce executable code to be executed by processing units of a network device. The domain-specific build system may include network processor specific macros that can be used for generating executable code from for the slow-path task descriptions written in a domain-specific HLL. A non-limiting example of various components of domain-specific compiler 104 are described below with reference to FIG. 2.

Figure 2:
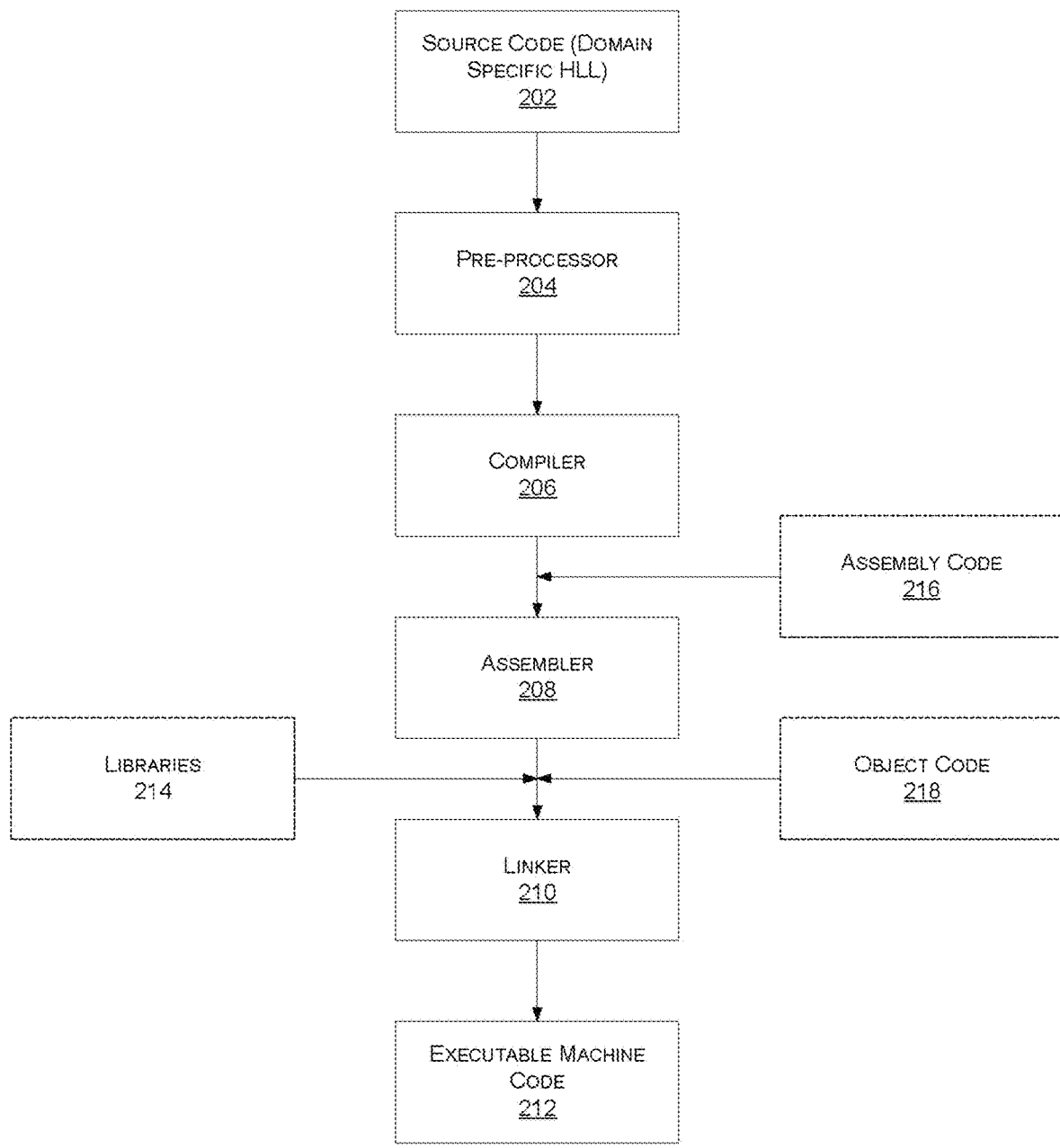
FIG. 2 is a block diagram illustrating various stages of a compiler in accordance with an embodiment of the present disclosure.

FIG. 2 is a block diagram illustrating various stages of a compiler in accordance with an embodiment of the present disclosure. In an embodiment, a domain-specific build system may include a domain-specific compiler. As shown in the FIG. 2, source code 202 written in a domain-specific HLL can be received by a domain-specific build system. Various stages used by the compiler of the domain-specific build system include a pre-processor 204, a compiler 206, an assembler 208 and a linker 210, that can receive the slow-path task description in domain-specific HLL and produce machine executable code for the target network device. In an embodiment, the pre-processor 204 can transform source code 202 for processing by the compiler 206 and resolve preprocessing directives. Network processor specific macros can be identified by the domain-specific build system during pre-processing step. In an embodiment, the pre-processor 204 refers to domain-specific macros and standard macros to replace those macros with their definitions, discovers dependencies and resolves preprocessor directives (e.g., #define, #include, and #if, etc.). In an embodiment, when a domain-specific compiler has a restricted target of only a GPP, the compilation stage can link against a dynamic or static library where all the macro references are resolved. If performance is an issue, then the library code can be compiled with the domain-specific language and the compiler optimizations can be performed. The compiler 206 can perform tasks such as macro-processing, augmentation, file inclusion, language extension etc.

In an embodiment, the preprocessed code by the pre-processor 204 can be fed to the compiler 206, which can convert the pre-processed code into a target assembly language code 216. Further an assembler 208 can receive the target assembly language code 216 and produce object files and required extensions. The assembler 208 can translate assembly language code 216 into machine code. The output of the assembler is called an object file, which contains a combination of machine instructions as well as the data required to place these instructions in memory. Further, linker 210 can link and merge various object files together in order to produce executable machine code 212. The linker 210 can receive object code 218 generated by different assemblers and include libraries and generate executable machine code 212. The major task of the linker 210 is to search and locate referenced module or routines in a program and to determine the memory location where these codes will be loaded, making the program instruction to have absolute references.

In an embodiment, when the domain-specific compiler is provided a NP target architecture for which executable code needs to be generated, it can refer to a corresponding macro library for the target NP. For example, the compiler 206 matches the source code's macros to macros of a macro library for the hardware module at issue. The compiler 206 can transform message send and receive codes, for example, into driver calls that will handle buffering, transmitting, and receive data sent to the NP. In an embodiment, the domain-specific compiler's output for target network processor may be segmented into a per-module segment internal representation code and whole-chip output control internal representation. In an embodiment, a compilation of the whole-chip control internal representation programs the tables and registers, for example, to take a packet from defined set of ports to the appropriate destination module and allow it to travel back to the GPP or out via another port. The per-module segment compiler can take the internal representation and link that against the module's libraries. Some pieces of this module segment code can be converted to programming firmware (where the control matches the input language control and whose macros represent specific defined library functions). Other pieces can be used to program the tables and registers in the module to allow the control firmware to be active in the generic sense defined by the High-Level-Language. The module-segment compiler can also produce a test wrapper code to allow that module to be verified with hooks for send/receive to/from the GPP into the wrapper.

Figure 3:
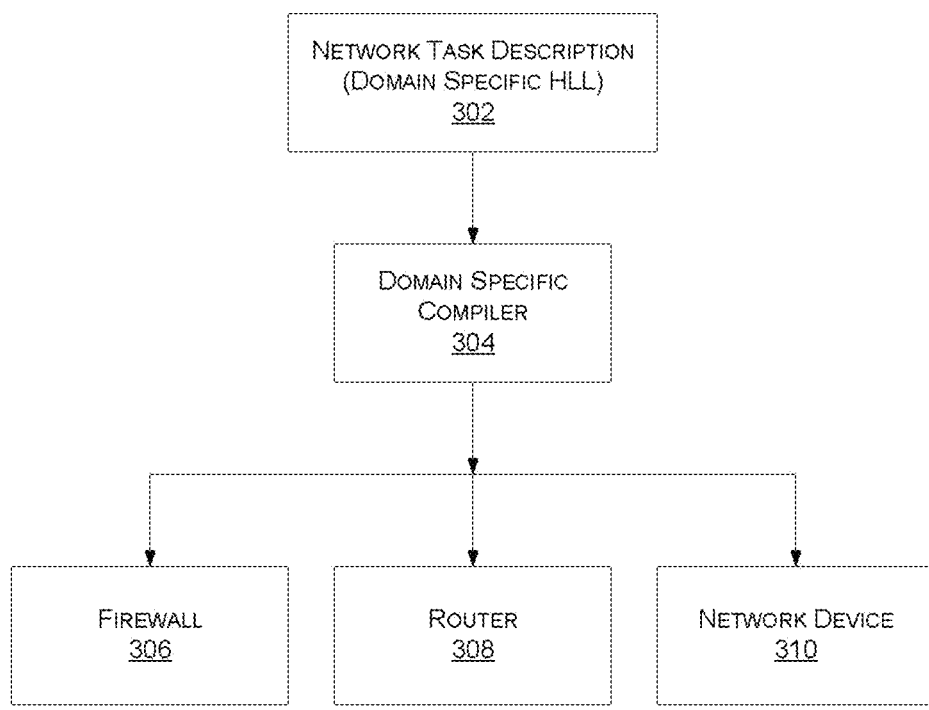
FIG. 3 is a block diagram illustrating an compiler used to generate executable code for different target network devices in accordance with an embodiment of the present disclosure.

FIG. 3 is a block diagram illustrating an compiler 304 used to generate executable code for different target network devices in accordance with an embodiment of the present disclosure. In an embodiment, domain-specific compiler 304 can receive a network task description 302 in the form of a domain-specific HLL and produce machine executable code for one of multiple target network devices (e.g., a firewall 306, a router 308 or another network device 310). The domain-specific compiler 304 can determine the types of one or more processors used by the target network device at issue and produce machine execute code accordingly. In an embodiment, when a network processor is determined to be available within the network device at issue, machine readable code for the network processor can be generated. While generating the machine executable code for the network processor, the domain-specific compiler can refer to specific macros provided by the hardware vendor producing the network processor. In an embodiment, the network task description 302 may include task description related to slow-path processing.

Figure 4:
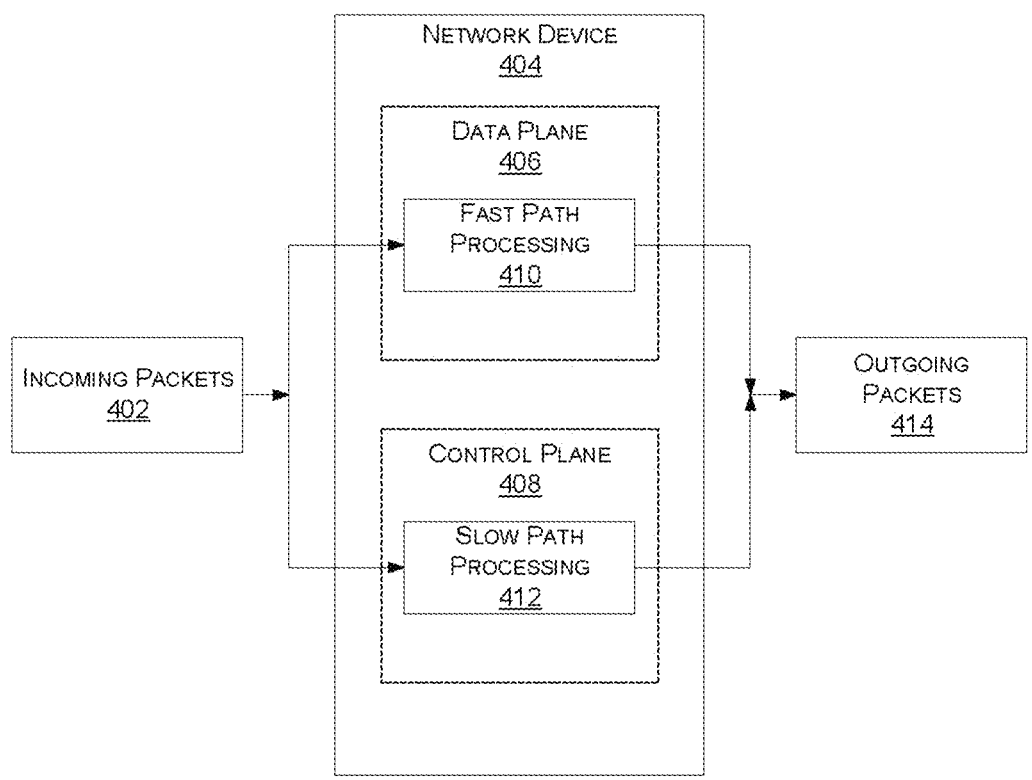
FIG. 4 is a block diagram conceptually illustrating fast-path processing and slow-path processing of packets by a network device in accordance with an embodiment of the present disclosure.

FIG. 4 is a block diagram fast-path processing and slow-path processing of packets by a network device 404 in accordance with an embodiment of the present disclosure. As those skilled in the art will appreciate, the network device 404 may perform various tasks in a data plane 406 and a control plane 408. A network device 404 may receive an incoming packet 402 and perform one of fast-path processing 410 and slow-processing tasks before sending the output packet 414. Tasks performed in the data plane 406 are commonly associated with the fast-path processing 410, which may include packet filtering and forwarding related task. Tasks performed in the control plane 408 may relate to device management. These are normally slow-path processing 412 tasks. For example, in a router, slow path processing 412 performed in the control plane 408 may include tasks related to routing protocols like Open Shortest Path First (OSPF) and Border Gateway Protocol (BGP), and management interfaces like serial ports, telnet, and Simple Network Management Protocol (SNMP). For a switch, the slow-path processing 412 tasks may include receiving updates about the status of web servers and providing a web interface for configuration and management. Error handling and logging are other representative control plane tasks that are performed by network devices. Empirical evidence suggests that tasks performed by the data plane 406 typically require a small amount of code, but a large amount of processing power, because of the time critical nature of the tasks that are performed in the data plane 406. In contrast, slow-path processing tasks 412 performed by the control plane 408 require less processing power, but a larger amount of code. As noted above, code for slow-path processing tasks is typically developed by network engineers in assembly language. As such, the proposed domain-specific HLL for describing slow-path tasks, an associated domain-specific build system and compiler makes modification of existing slow-path tasks and/or creation of new slow-path tasks more broadly accessible, for example, to customers.

Figure 5:
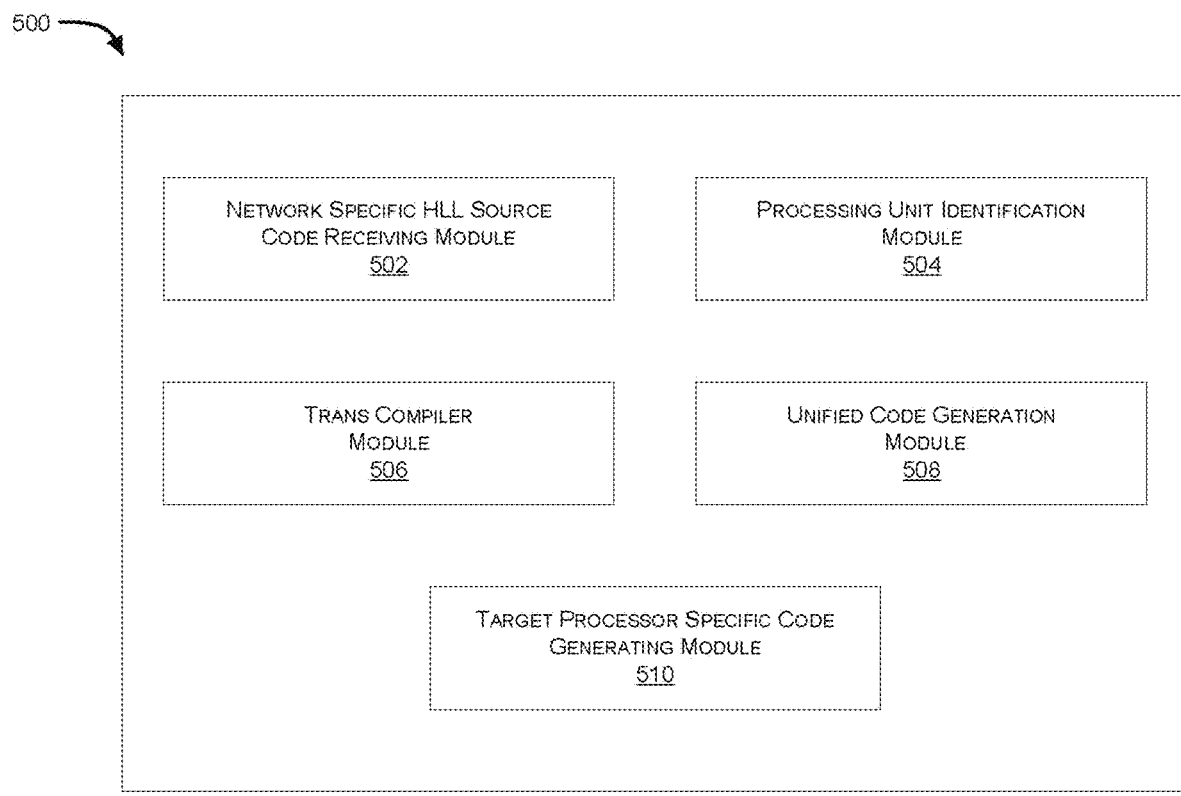
FIG. 5 illustrates functional modules of a domain-specific build system in accordance with an embodiment of the present disclosure.

FIG. 5 illustrates functional modules of a domain-specific build system 500 in accordance with an embodiment of the present disclosure. In an embodiment, functional modules of a domain-specific build system 500 may include network specific HLL source code receiving module 502 configured to receive source code in a form of a domain-specific language, wherein the domain-specific language describes a slow-path networking task that is to be performed by a network device. The domain-specific language may allow a user to describe the slow-path processing task using combinations of various functionalities (e.g., general variable definitions, general loop or flow control, network application specific bit operations, network application specific data structure descriptions, network application specific memory access descriptions, interfacing between network processor modules, hardware threat switching of an embedded network application specific processor, and hardware thread switching of individual modules inside a network application specific processor) provided by the domain-specific language.

Non-limiting examples of various keywords, bit operation macros, table access macros and messaging macros for describing slow-path processing tasks are described below with reference to Table 1.

TABLE 1

Examples of some basic keywords supported by a domain-specific HLL language that can be used to describe slow-path tasks.

| | Name | Description |
|---|---|---|
| 1 | uint8p/uint16p/uint32p/ uint64p/uint128p | Persistent variables and the corresponding one-dimensional array. Persistent when switching hardware thread until halt is executed. |
| 2 | uint8v/uint16v/uint32v/ uint64v/uint128v | Volatile variables and the corresponding one-dimensional array. Become unknown value after hardware thread switch. |
| 3 | for/while/goto/break/ continue | Looping control statements |
| 4 | return | Pop element from stack and return to caller |
| 5 | if/else | Single condition control logic |
| 6 | switch/case/default | Selector dispatch logic |
| 7 | halt | release all persistent variables and volatile variables |

As illustrated in Table 1, the domain-specific HLL may provide unsigned 8/16/32/64/128-bit persistent variable types. The same set of keywords can be used to declare one-dimensional arrays. As one may appreciate, when switching between hardware threads, the values of defined variables should be persisted, hence these persistence variable types facilitate the description of various slow-path tasks involving multiple hardware modules. Row 2 illustrates an exemplary list of unsigned 8/16/32/64/128-bit volatile variable types, which can be used to declare one-dimensional arrays. When switching hardware threads, the values of volatile variables cannot be relied upon to maintain their state as the values become unknown. Row 7 illustrates the keyword "halt". Use of this keyword may be indication that application or functional module has completed the current process. At this point, hardware resources and all the declared persistent variables may be released, for example, to be made available for processing of the next packet. These keywords are intended merely for illustration and are not intended to represent a comprehensive list of keywords that may be supported by the domain-specific HLL. The keywords and associated description can be used to map source code written in the domain-specific HLL with the hardware specific macros to generate target network processor specific executable code. Non-limiting examples of bit operations that may be supported by the domain-specific HLL in accordance with an embodiment are described below with reference to Table 2.

TABLE 2

Examples of bit operation macros.

| | Name | Description |
|---|---|---|
| 1 | Bit_extract (n, p) | Mask out "n" bits starting at position "p". Move right "p" bits. Extract certain bits from a register. |
| 2 | Bit_deposit (n, p, r) | Take "n" bits from register at left shift 'p' bits and OR with another register value 'r'. Move bits from one register into another at specified position and OR a base register. |
| 3 | Byte_swap (size, r) | Endian swap bytes from register 'r' |
| 4 | CRC (array_pointer, sizeofelement, num_of_elements) | Calculates the CRC for the input data using the default CRC function. |

Table 3 illustrates an example list of table access macros. Rows 1 through 4 illustrate exemplary linked list operation macros. Rows 5 through 8 illustrate exemplary linear table operation macros. Rows 9 through 10 illustrate exemplary hash table operation macros.

TABLE 3

Exemplary table access macros

| | Name | Descriptions |
|---|---|---|
| 1 | linked_list_search (H, key array) | Search for data using hash function H and key |
| 2 | linked_list_insert (H, key, data) | Insert data |
| 3 | linked_list_search_and_update (H, key, data, field) | Find entry, update if matched. |
| 4 | linked_list_search_and_delete ( ) | Match and delete or delayed delete |
| 5 | linear_table_alloc ( ) | Allocate table with size X bytes (w bytes per word) from pool |
| 6 | linear_table_free (id) | Re-add table with "id" back into pool |
| 7 | linear_table_read (id, byteoffset) | Read a uint64_t chunk of memory from table starting at "byteoffset" |
| 8 | linear_table_write (id, byteoffset, data, datalen) | Write a chunk of data to identified table at specified offset |
| 9 | hash_table_read (key) | Read entry from hash table using search key "key" |
| 10 | hash_table_write (key, field, data) | Write field data to hash table entry |

Table 4 illustrates an example list of messaging macros that can used to describe slow-path tasks. The messaging may take place between general purpose processors, between general purpose processors and network processors, between network processors, or between modules of the same network processor. In some cases, the peripheral logic of network processors can handle the messaging. In some cases, the peripheral logic of individual modules inside a network processor handle the messaging. A user writing the source code for a particular network task may or may not be aware of the hardware details of messaging, as such use of implementation independent macros, such as those described herein, reduces the complexity of coding network tasks.

TABLE 4

Example messaging macros.

| | Name | Description |
|---|---|---|
| 1 | message_send (receiver_id, array_pointer, num_of_elements, return_pointer) | Send message to destination module |
| 2 | message_receive ( ) | Poll message receive queue until message received. Blocking request |

Table 5 illustrates exemplary hardware thread macros supported by the domain-specific HLL language that can be used to describe slow-path tasks. A network processor may have multiple hardware threads processing multiple network packets or performing parallel operations on the same packet. Again, without requiring the user to understand the underlying hardware details of context switching for the particular processor at issue, the user may use the device-independent macros to switch among various threads. For example, the switch_to_next_thread macro of row 1 can be used to activate another thread in accordance with a specified priority_policy.

TABLE 5

Exemplary hardware thread macros.

| | Name | Description |
|---|---|---|
| 1 | switch_to_next_thread (priority_policy) | Exemplary priority policies include (1) the highest priority except the current one, (2) the next thread in Round-robin order. All volatile variable values become unknown, while all persistent variable values are kept. |

Table 6 illustrates example network processor instructions that can used to describe slow-path tasks. The instructions may have variable-length and may be extended or reduced to support more or fewer features as desired. In accordance with an embodiment, extra instructions may be added to accelerate application specific computation.

As a user describing a slow-path task may not be familiar with the hardware specific macros, the macros supported by the domain-specific HLL may be handy. In an embodiment, the domain-specific build system can determine the type(s) of one or more processors of a network device that are available to implement the network task described by the domain-specific HLL and may partition the source code and generate machine executable code accordingly.

In one embodiment, the network specific HLL source code receiving module 502 can receive network slow-path task descriptions in the form of network specific HLL source code for a network device. The source code describing the slow-path task may include any one or combination of— general variable definitions, general flow control statements, general loop control statements, network application specific bit operations, network application specific data structure descriptions, network application specific memory access descriptions, macros describing messaging between network processor modules, and hardware thread switching. The source code may also include any or combination of persistent data types, volatile data types, device independent macros, device independent linked list operation macros, device independent linear table operation macros, device independent hash table operation macros, inter-module messaging macros, link list operation instructions, linear table operation instructions, hash table operation instructions and inter-module messaging operation instructions.

In an embodiment, the domain-specific build system 500 may include a processing unit identification module 504 configured to determine one or more types of processors that are available within the network device to perform networking functions, for example, implementing a slow-path task. In an embodiment, the processing unit identification module 504 can determine the type(s) of processing unit(s) by discovering the identity of the target network device. In an embodiment, the processing unit identification module 504 may receive information identifying the target network device (e.g., serial number, model number, etc.) programmatically or via input from a user.

In an embodiment, the processing unit identification module 504 can analyze the source code and determine a preferred type of processor of the plurality of types of processors by which the portion of the source code would be most efficiently implemented. For each portion of a plurality of portions of the source code, the module 504 determines the type of processor which may be most suitable for execution of the specific portion. It may be that some portions, which may also be referred to herein interchangeably as segments, are most effectively carried out by a specific type of processor, for example, a network processor. In an embodiment, when the preferred type of processor is among the one or more types of processors that are available within the network device, executable code targeting the preferred type of processor based on the portion of the source code can be generated. Similarly, when the preferred type of processor is not among the one or more types of processors that are available within the network device, intermediate code, in a form of a high-level programming language, targeting a general purpose processor available within the network device can be generated. In an embodiment, the one or more types of the plurality of types of processors that are available within the network device may be network processor(s).

In an embodiment, a trans-compiler module 506 can generate an intermediate representation of one portion of the source code in a form of another high level language and domain-specific intermediate representation for another portion of the source code. In an embodiment, a unified code generation module 508 can generate unified code for GPP from the corresponding intermediate representation. In an embodiment, a target processor specific code generation module 510 can generate executable machine code for the identified network processor.

In an embodiment, the domain-specific compiler can perform one or more optimizations on the intermediate representation prior to generation of binary code or a separate tool may be used to perform such optimizations. As one may appreciate, the high-level programming language in which intermediate representation for portion of code to be execute on the GPP is created may be a procedural programming language, (e.g., the C programming language) or an object-oriented programming language (e.g., the C++ programming language).

In an embodiment, the trans compiler module 506 can be configured to produce an intermediate representation in the form of another HLL or to produce a target hardware specific intermediate representation or domain-specific intermediate representation. The trans compiler module 506 can compile one part of the source into a first intermediate representation (e.g., another FILL) and another part of the source code into a second intermediate representation (e.g., a domain-specific intermediate representation).

In an embodiment, a suitable compilation module, for example unified code generation module 508 or target process specific code generation module 510 or both can be selected based on determination of the one or more processing units used by the target network device. In an embodiment, the domain-specific build system 500 compiles the source code using a domain-specific compiler to generate executable code for the processing units of the network device at issue. For example, the domain-specific build system 500 may create a domain-specific intermediate representation of the source code and generates executable code for the network processor, using the domain-specific compiler in response to the determination that the processing unit is a network processor. Similarly, in response to the determination that the processing unit is a general-purpose processor, the domain-specific build system 500 may create a traditional high-level language code representation, using the domain-specific compiler and may then generates executable code for the general purpose processor, using a traditional high-level language compiler corresponding to the high-level language.

In one embodiment, the domain-specific build system 500 can analyze the source code describing slow-path processing and split the source code in to a first part to be executed by a general-purpose processor and a second part to be executed by a network processor. In an embodiment, the trans compiler module 506 can generate a traditional high-level language code for the first part and generate a different intermediate representation for the second part. In an embodiment, the trans compiler module 506 can generate the intermediate representation for the entirety of the source code in either the traditional high-level language if the target processing unit is a GPP or can generate domain-specific intermediate representation if the target processing unit is a network processor.

In an embodiment, a suitable software development kit, which may include the domain-specific build system 500 and the domain-specific compiler, can be provided to a user for writing and compiling domain-specific HLL source code for target network device(s).

The target network device may be any of a gateway device, a network controller device, a firewall, a router, a switch, a unified threat management (UTM) appliance, an Intrusion Prevention System (IPS), an Intrusion Detection System (IDS), a Distributed Denial of Service (DDoS) prevention device, and a software defined networking security device.

The processing described below with reference to the flow diagrams of FIGS. 6, 7A, 8, and 9 may be implemented in the form of executable instructions stored on a non-transitory machine readable medium and executed by a hardware processing resource (e.g., a microcontroller, a microprocessor, central processing unit core(s), an application-specific integrated circuit (ASIC), a field programmable gate array (FPGA), a network processing unit (NPU), and the like) and/or in the form of other types of electronic circuitry. For example, processing may be performed by one or more virtual or physical computer systems of various forms, such as the computer system described with reference to FIG. 10 below.

Figure 6:
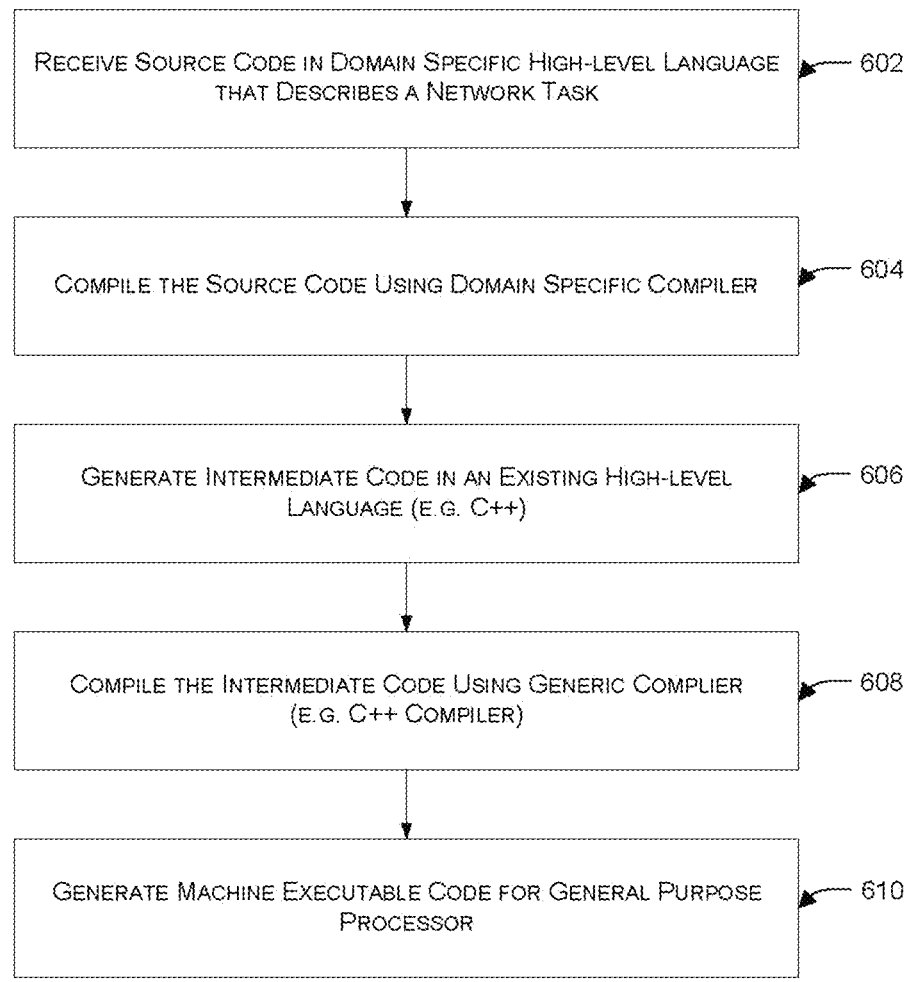
FIG. 6 is a flow diagram illustrating compilation processing in accordance with a first embodiment of the present disclosure.

FIG. 6 is a flow diagram illustrating compilation processing in accordance with a first embodiment of the present disclosure. In the context of the present example, the compilation process may include various steps in which it receives slow-path task description in domain-specific high-level language and compiles it to generate executable machine code for execution by one or more types of processors of a target network device. In an embodiment, the compiler receives source code in a domain-specific high-level language that describes a network task to be executed by a network device as shown at block 602, compiles the source code using a domain-specific compiler as shown at block 604, and generates an intermedia representation in the form of an existing high-level language (e.g. C++) as shown at block 606. The compiler further compiles the intermedia representation using a generic compiler (e.g., the GNU Compiler Collection (GCC) compiler for C++) as shown at block 608 and generates machine executable code for a general purpose processor as shown at block 610. As one may appreciate, this first embodiment may be used when a target processing unit that will perform the slow-path process described by the source code is a GPP.

Figure 7A:
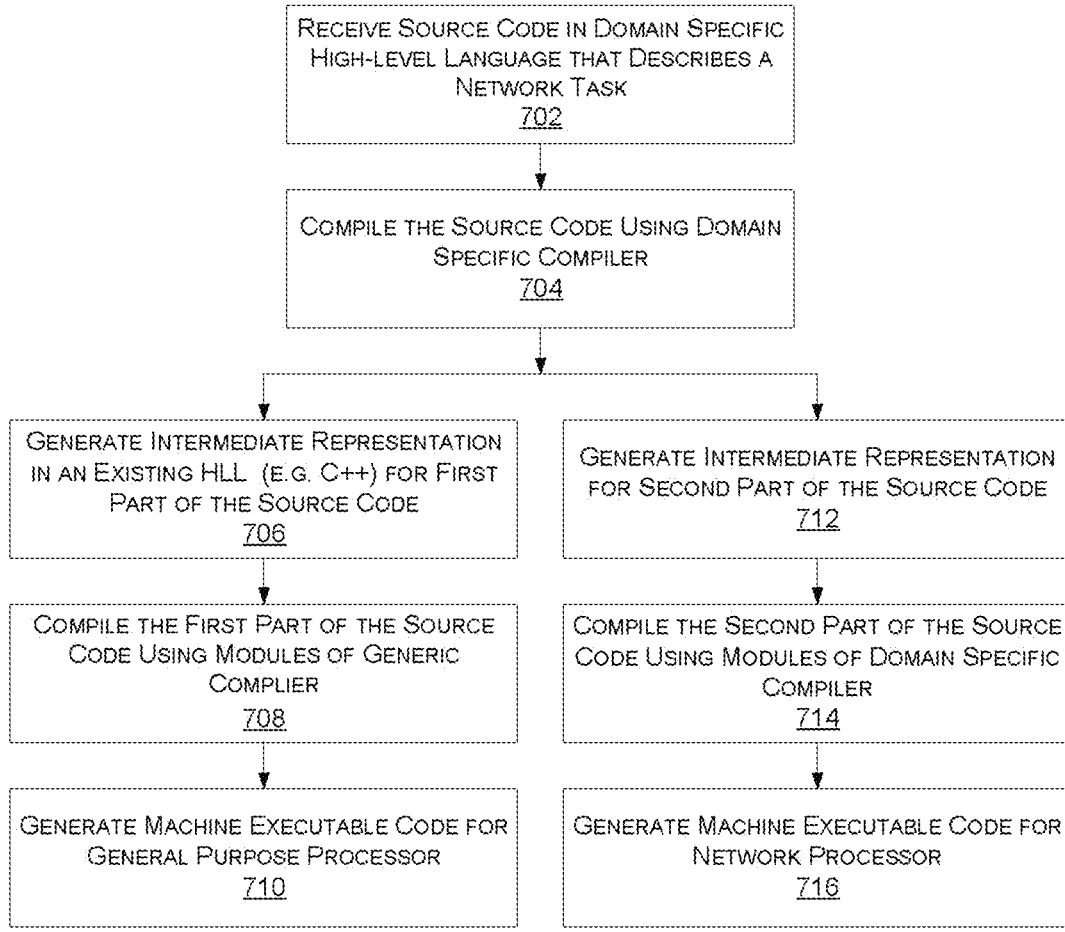
FIG. 7A is a flow diagram illustrating compilation processing in accordance with a second embodiment of the present disclosure.

FIG. 7A is a flow diagram illustrating compilation processing in accordance with a second embodiment of the present disclosure. In the context of the present example, it is assumed the target network device has multiple types of processing resources (e.g., one or more GPPs and on or more NPs). As such, based on source code described in a domain-specific language, the compilation process may generate executable code targeted for one or more GPPs based on a first part of the source code and may generate executable code targeted for one or more NPs based on a second part of the source code.

At block 720, the compiler receives source code in a domain-specific high-level language that describes a network task, for example, a slow-path task. Assuming, the source code includes at least one portion to be executed by a GPP and at least one portion to be executed by an NP of the target network device, at block 704, the source code is compiled using a domain-specific compiler to generate two separate intermediate representations (e.g., one in the form of a traditional HLL and another in the form of a domain-specific intermediate representation). For example, the compiler can generate an intermediate representation in the form of an existing HLL (e.g., C or C++) for a first part of the source code as shown at block 706 and generate a second intermediate representation for a second part of the source code as shown at block 708 in the form of a domain-specific intermediate representation. As those skilled in the art will appreciate, the first part of the source code represents those instructions that are to be executed by a GPP and the second part of the source code are those instructions that are to be executed by a network processor. In an embodiment, the compiler can split the source code into the first part and the second part after performing initial processing to determine the type(s) of processing unit(s) available in the network device at issue.

Depending upon the macro libraries available for a particular GPP and a particular NP, there may be some operations that are capable of being performed only by the GPP, only by the NP, or by either the GPP or the NP. For those operations that are capable of being performed by either the GPP or the NP, in one embodiment, it may be assumed by the compiler that such operations would be more efficiently performed by the NP. Based on this assumption, the compiler may associate such operations with a portion of the source code that will ultimately be compiled into executable code targeted for the NP, whereas the other operations may be associated with another portion of the source code that will ultimately be compiled into executable code targeted for the GPP. As such, as noted above, the user may write the source code without knowing whether the target network device includes an NP and the compiler can make use of the NP if one exists within the target network device. Alternatively, the compiler may include a preference table to resolve for which of multiple types of processing units executable code should be generated when more than one of the available types of processing units are capable of performing the operation at issue.

Returning to the current example, the compiler further compiles the first part of the source code using modules of generic compiler as shown at block 708 and generate machine executable code for GPP as shown at block 710. In an embodiment, the compiler can compile the second part of the source code (e.g., those operations or macros deemed to be more efficiently performed by the NP) using modules of the domain-specific compiler as shown at block 714 and generate machine executable code for network processor.

Figure 7B:
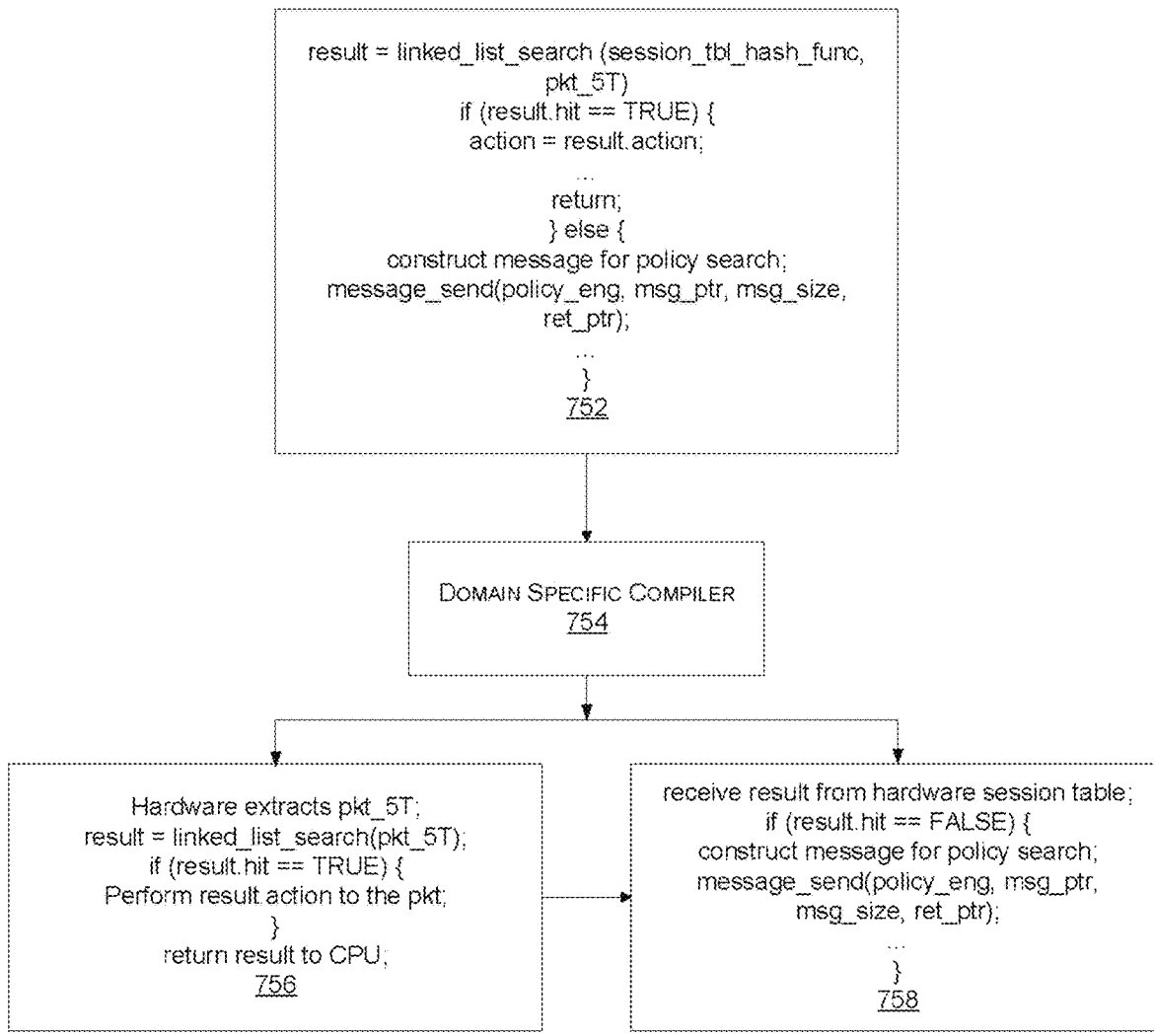
FIG. 7B illustrates example source code for which multiple intermediate representations are generated accordance with an embodiment of the present disclosure.

FIG. 7B illustrates example source code 752 for which multiple intermediate representations are generated accordance with an embodiment of the present disclosure. As shown in FIG. 7B, a network task description 752 written in a domain-specific HLL is input to a domain-specific compiler 754. In the context of the present example, the source code 752 describes slow-path processing relating to performance of an action on a packet based on a policy matching the packet. In the context of the current example, the network device at issue includes both an NP and a GPP (e.g., a CPU). Responsive to receipt of the source code 752, the domain-specific compiler 754, identifies a first set of operations (i.e., those compiled into a first intermediate representation of block 756) that are deemed to be more efficiently performed by the NP (e.g., based on matching macros being found within a macro library associated with the NP and/or the relative priorities or preferences assigned to the NP and the GP) and a second set of operations (i.e., those compiled into a second intermediate representation of block 758) that are deemed to be more efficiently performed by the GPP (e.g., based on matching macros being found within a macro library associated with the GPP and/or the relative priorities/ preference values assigned to the NP and the GPP).

In this example, extraction of the five tuple of the packet, performing a search of the linked list representing the hardware session table, and performing the action associated with the matching session table entry (if a match is found) are operations that will be performed by the NP. As such, the first intermediate representation 756 is generated by the domain-specific compiler 754 that will subsequently be compiled into executable code targeted for the NP.

Meanwhile, operations associated with performance of a policy search, including constructing a message for the policy search and sending the message to a policy engine, are operations that will be performed by the GPP. Therefore, in this example, the second intermediate representation 758 is generated by the domain-specific compiler 754 that will subsequently be compiled into executable code targeted for the GPP.

Figure 8:
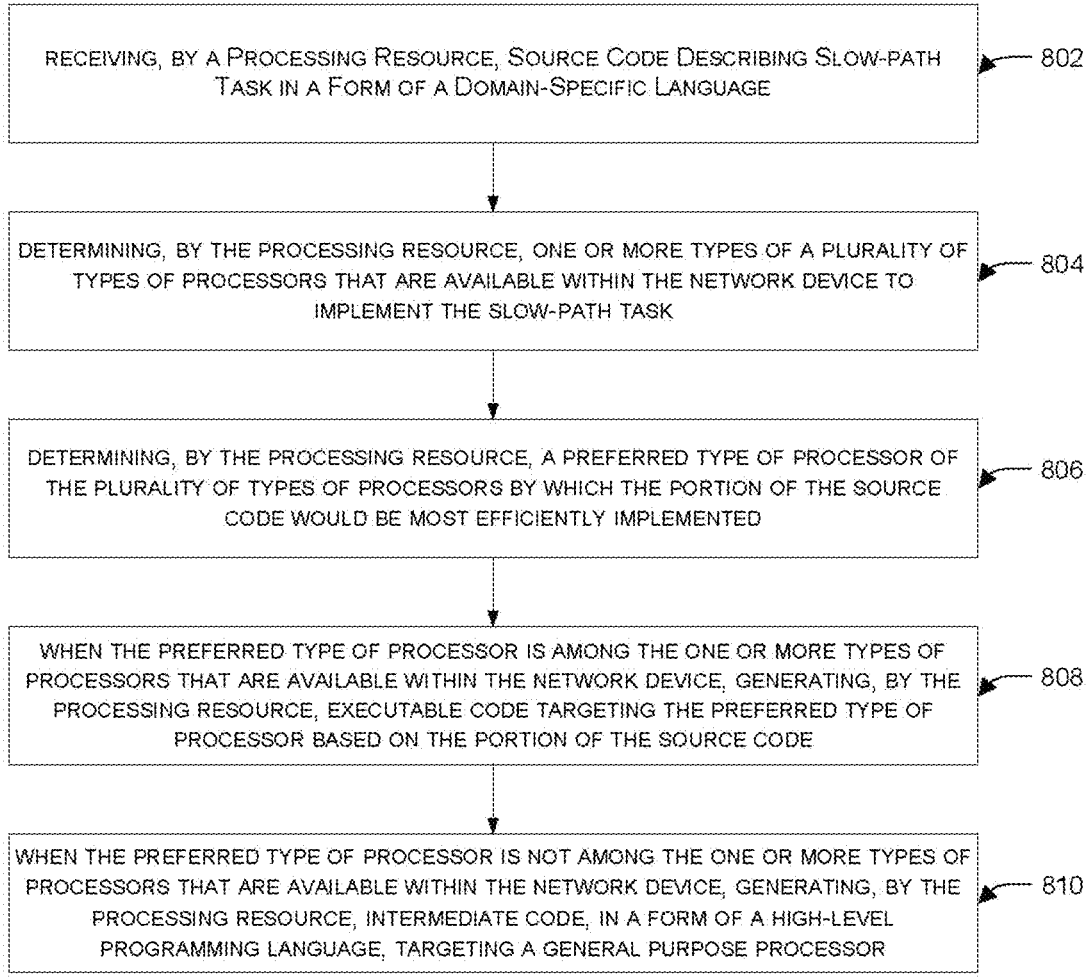
FIG. 8 is a flow diagram illustrating compilation processing in accordance with a third embodiment of the present disclosure.

FIG. 8 is a flow diagram illustrating compilation processing in accordance with a third embodiment of the present disclosure. In a third embodiment, the compilation process may include steps of determining type(s) of processing units available within a network device at issue and on which respective portions of source code will be executed and compiling the source code accordingly. As show in FIG. 8, the process may include steps of receiving, by a processing resource, source code in the form of a domain-specific language, as show at block 802. The domain-specific language describes a slow-path task that is to be performed by the network device at issue. Further the process include steps of determining, by the processing resource, one or more types of a plurality of types of processors that are available within the network device to implement the slow-path task as show at block 804. For example, the type(s) of processing units available may be determined based on a model number and/or a serial number of the network device at issue.

At block 806, for each portion of multiple portions of the source code, the processing resource determines a preferred type of processor of the multiple of types of processors by which the portion of the source code would be most efficiently implemented. The compilation processing further includes generating, by the processing resource, executable code targeting the preferred type of processor based on the portion of the source code as shown at block 808, when the preferred type of processor is among the one or more types of processors that are available within the network device. For example, as noted above, when one or more GPPs and one or more NPs are available in the network device at issue and the operation at issue is capable of being performed by either type of processing unit, the compiler may prioritize the NP over the GPP or may alternatively lookup a priority or preference value for the operation at issue within a preference table.

At block 810, when the preferred type of processor (e.g., an NP) is not among the one or more types of processors that are available within the network device at issue, then the processing resource may generate intermediate code in a form of a high-level programming language targeting the type of processing unit available (e.g., a GPP).

Based on the foregoing, those skilled in the art will appreciate, a network processor may be among the one or more types of the multiple types of processors that are available within the network device. In a scenarios in which the preferred type of processor is the network processor for a particular set of operations, executable code targeting the NP will be generated for the particular set of operations. Generating the executable code targeting the NP may include compiling, by the processing resource, the portion of the source code containing the particular set of operations into an intermediate representation, and generating, by the processing resource, binary code targeting the network processor by compiling the intermediate representation.

Figure 9:
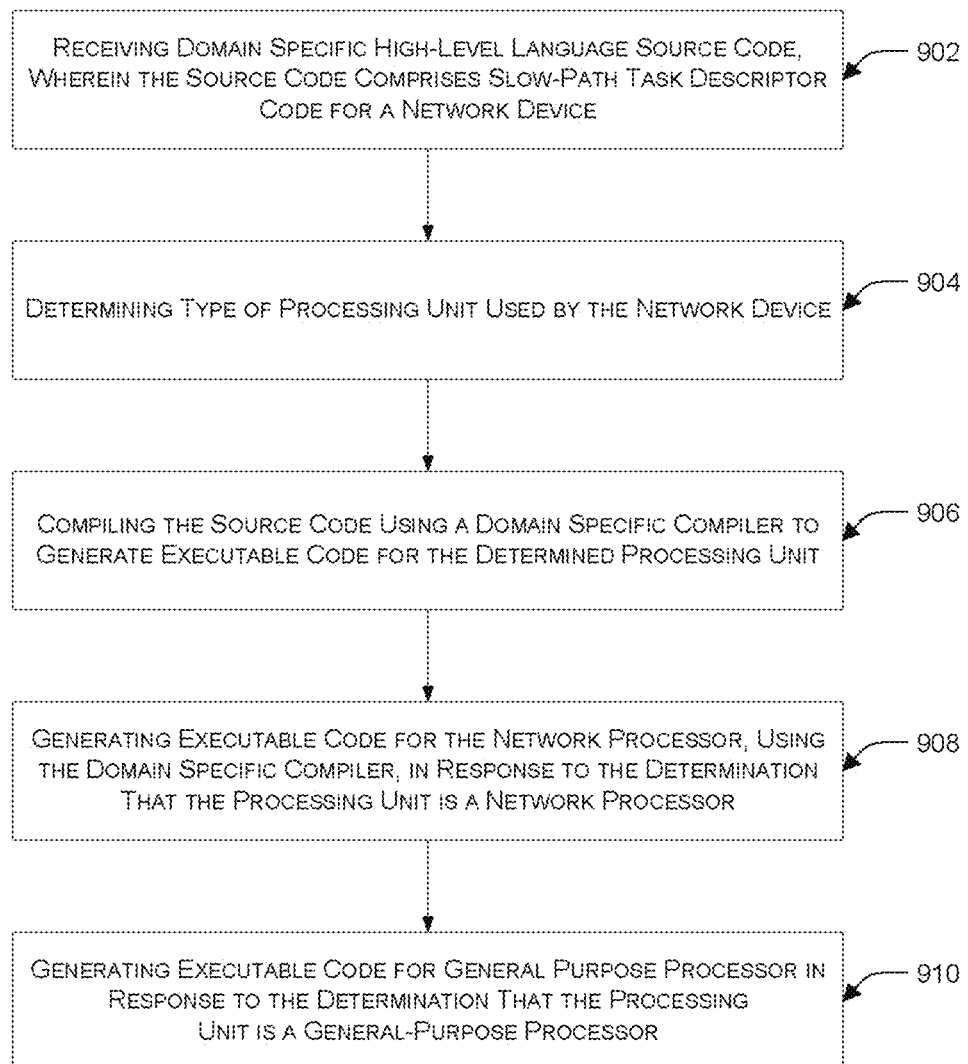
FIG. 9 is a flow diagram illustrating compilation processing in accordance with a forth embodiment of the present disclosure.

FIG. 9 is a flow diagram illustrating compilation processing in accordance with a fourth embodiment of the present disclosure. In an embodiment, compilation process may include receiving domain-specific HLL source code, wherein the source code comprises slow-path descriptor code for a network device as shown at block 902, determining type of processing unit used by the network device as shown at block 904, and compiling the source code using a domain-specific compiler to generate executable code for the determined processing unit as shown at block 906. The compilation process may further include generating executable code for the network processor, using the domain-specific compiler, in response to the determination that the processing unit is a network processor as shown at block 908 and generating executable code for the general-purpose processor in response to the determination that the processing unit is a general-purpose processor as shown at block 910. In an embodiment, the executable code for the general-purpose processor can be generated using modules of a traditional HLL compiler.

In an embodiment, compiling the source code using the domain-specific compiler may include steps of splitting the sources code into a first part to be executed by a general-purpose processor and a second part to be executed by a network processor, generating a traditional high-level language code for the first part, and generating an intermediate representation for the second part.

Figure 10:
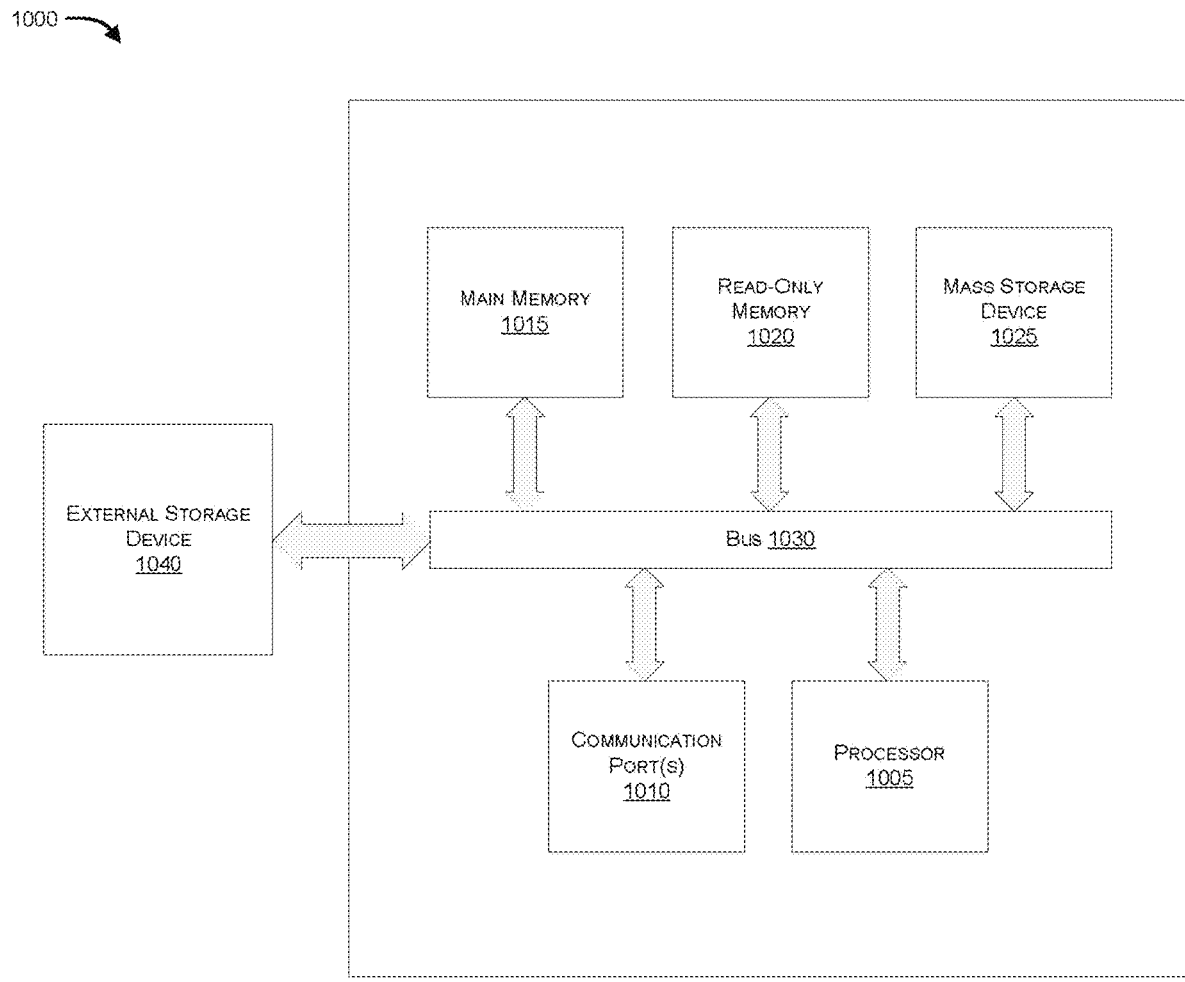
FIG. 10 illustrates an exemplary computer system in which or with which embodiments of the present invention may be utilized.

FIG. 10 illustrates an exemplary computer system 1000 in which or with which embodiments of the present invention may be utilized. As shown in FIG. 10, computer system includes an external storage device 1040, a bus 1030, a main memory 1015, a read only memory 1020, a mass storage device 1025, a communication port 1010, and a processing resource (e.g., processor 1005). Some or all of computer system 1000 may be represented within a separate computer system (e.g., an end user workstation) that compiles the source code or within a network device (e.g., network device 404, firewall 306, router 308, or other network device 310).

Those skilled in the art will appreciate that computer system 1000 may include more than one processor 1005 and communication ports 1010. Examples of processor 1005 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1005 may include various modules associated with embodiments of the present invention.

Communication port 1010 can be any of an RS-232 port for use with a modem-based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which computer system connects.

Memory 1015 can be Random Access Memory (RAM), or any other dynamic storage device commonly known in the art. Read only memory 1020 can be any static storage device(s) e.g., but not limited to, a Programmable Read Only Memory (PROM) chips for storing static information e.g. start-up or BIOS instructions for processor 1005.

Mass storage 1025 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1030 communicatively couples processor(s) 1005 with the other memory, storage and communication blocks. Bus 1030 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1005 to software system.

Optionally, operator and administrative interfaces, e.g. a display, keyboard, and a cursor control device, may also be coupled to bus 1020 to support direct operator interaction with computer system. Other operator and administrative interfaces can be provided through network connections connected through communication port 1010. External storage device 1010 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
receiving, by a processing resource, source code in a form of a domain-specific language, wherein the domain-specific language describes a slow-path task that is to be performed by a network device, and wherein the source code includes a first portion and a second portion;
determining, by the processing resource, a first processor type and a general purpose processor that are available within the network device to implement the slow-path task, and that a second processor type is not available within the network device to implement the slow-path task; and
for the first portion of the source code:
determining, by the processing resource, that the first processor type is better suited to the first portion than the general purpose processor;
based at least in part on the determination that the first processor type is available within the network device, generating, by the processing resource, executable code targeting the first processor type based on the first portion of the source code; and
for the second portion of the source code:
determining, by the processing resource, that the second processor type is better suited to the second portion than the general purpose processor;
based at least in part on the determination that the second processor type is not available within the network device, generating, by the processing resource, intermediate code, in a form of a high-level programming language, targeting the general purpose processor available within the network device based on the second portion of the source code.

2. The method of claim 1, wherein the first processor type is a network processor, and wherein said generating, by the processing resource, executable code targeting the first processor type comprises:
compiling, by the processing resource, the first portion of the source code into an intermediate representation; and
generating, by the processing resource, binary code targeting the network processor by compiling the intermediate representation.

3. The method of claim 2, further comprising: performing, by the processor, one or more optimizations on the intermediate representation prior to generation of the binary code.

4. The method of claim 2, wherein compiling, by the processing resource, the first portion of the source code into an intermediate representation includes: generating an indication that the first processor type is desired for the first portion, and wherein determining, by the processing resource, that the first processor type is better suited to the first portion than the general purpose processor is based at least in part on the indication that the first processor type is desired for the first portion.

5. The method of claim 1, wherein the high-level programming language comprises a procedural programming language.

6. The method of claim 5, wherein the procedural programming language is C.

7. The method of claim 1, wherein the high-level programming language comprises a hybrid language that supports both procedural programming and object-oriented programming.

8. The method of claim 7, wherein the hybrid language is C++.

9. The method of claim 1, wherein the network device comprises any or a combination of a gateway device, a network controller device, a firewall, a router, a unified threat management (UTM) appliance, an Intrusion Prevention System (IPS), an Intrusion Detection System (IDS), a Distributed Denial of Service (DDoS) prevention device, and a software defined networking security device.

10. The method of claim 1, wherein the source code includes a first indication of processor preference for the first portion and a second indication of processor preference for the second portion, and wherein determining, by the processing resource, that the first processor type is better suited to the first portion than the general purpose processor is based at least in part on the first indication of processor preference.

11. A non-transitory computer-readable medium storing instructions, which when executed by a processing resource cause the processing resource to perform a method comprising:
receiving source code in a form of a domain-specific language, wherein the domain-specific language describes a slow-path task that is to be performed by a network device, and wherein the source code includes a first portion and a second portion;
determining a first processor type and a general purpose processor that are available within the network device to implement the slow-path task, and that a second processor type is not available within the network device to implement the slow-path task; and
for the first portion of the source code:
determining that the first processor type is better suited to the first portion than the general purpose processor;
based at least in part on the determination that the first processor type is available within the network device, generating executable code targeting the first processor type based on the first portion of the source code; and
for the second portion of the source code:
determining that the second processor type is better suited to the second portion than the general purpose processor;
based at least in part on the determination that the second processor type is not available within the network device, generating intermediate code, in a form of a high-level programming language, targeting the general purpose processor available within the network device based on the second portion of the source code.

12. The non-transitory computer-readable medium of claim 11, wherein the first processor type is a network processor, and wherein said generating executable code targeting the first processor type comprises:
compiling the first portion of the source code into an intermediate representation; and
generating binary code targeting the network processor by compiling the intermediate representation.

13. The non-transitory computer-readable medium of claim 12, wherein the method further comprises performing one or more optimizations on the intermediate representation prior to generation of the binary code.

14. The non-transitory computer-readable medium of claim 11, wherein the high-level programming language comprises a procedural programming language.

15. The non-transitory computer-readable medium of claim 14, wherein the procedural programming language is C.

16. The non-transitory computer-readable medium of claim 11, wherein the high-level programming language comprises a hybrid language that supports both procedural programming and object-oriented programming.

17. The non-transitory computer-readable medium of claim 16, wherein the hybrid language is C++.

18. The non-transitory computer-readable medium of claim 11, wherein the network device comprises any or a combination of a gateway device, a network controller device, a firewall, a router, a unified threat management (UTM) appliance, an Intrusion Prevention System (IPS), an Intrusion Detection System (IDS), a Distributed Denial of Service (DDoS) prevention device, and a software defined networking security device.

19. A system comprising:
 a processing resource; and
 a non-transitory computer-readable medium, coupled to the processing resource, having stored therein instructions that when executed by the processing resource cause the processing resource to perform a method comprising:
  receiving source code in a form of a domain-specific language, wherein the domain-specific language describes a slow-path task that is to be performed by a network device, and wherein the source code includes a first portion and a second portion;
  determining a first processor type and a general purpose processor that are available within the network device to implement the slow-path task, and that a second processor type is not available within the network device to implement the slow-path task;
  for the first portion of the source code:
   determining that the first processor type is better suited to the first portion than the general purpose processor;
   based at least in part on the determination that the first processor type is available within the network device, generating executable code targeting the first processor type based on the first portion of the source code; and
  for the second portion of the source code:
   determining that the second processor type is better suited to the second portion than the general purpose processor;
   based at least in part on the determination that the second processor type is not available within the network device, generating intermediate code, in a form of a high-level programming language, targeting the general purpose processor available within the network device based on the second portion of the source code.

20. The system of claim 19, wherein the first processor type is a network processor, and wherein said generating executable code targeting the first processor type comprises:
 compiling the first portion of the source code into an intermediate representation; and
 generating binary code targeting the network processor by compiling the intermediate representation.

21. The system of claim 19, wherein the high-level programming language comprises a procedural programming language.

22. The system of claim 19, wherein the network device comprises any or a combination of a gateway device, a network controller device, a firewall, a router, a unified threat management (UTM) appliance, an Intrusion Prevention System (IPS), an Intrusion Detection System (IDS), a Distributed Denial of Service (DDoS) prevention device, and a software defined networking security device.

* * * * *